United States Patent
Minieri

[15] 3,642,501
[45] Feb. 15, 1972

[54] SURFACE-COATING COMPOSITIONS CONTAINING ORGANOTIN FUNGICIDES

[72] Inventor: Pasquale P. Minieri, Woodside, N.Y.
[73] Assignee: Tenneco Chemicals, Inc.
[22] Filed: Jan. 15, 1970
[21] Appl. No.: 3,194

Related U.S. Application Data

[63] Continuation-in-part of Ser. No. 708,802, Feb. 28, 1968, Pat. No. 3,524,869.

[52] U.S. Cl. ............................ 106/15 AF, 260/45.75 K
[51] Int. Cl. .................................. C08f 45/64, C09d 5/14
[58] Field of Search .......... 106/15 AF, 263; 260/45.75 K, 260/429.7; 424/288

[56] References Cited

UNITED STATES PATENTS

| | | | |
|---|---|---|---|
| 2,702,775 | 2/1955 | Kerr et al. | 424/288 |
| 3,214,279 | 10/1965 | Scott | 424/288 |
| 3,214,453 | 10/1965 | Stern | 260/429.7 |
| 3,488,202 | 1/1970 | Princen | 106/15 |
| 3,524,869 | 8/1970 | Minieri | 260/429.7 |

FOREIGN PATENTS OR APPLICATIONS

| | | | |
|---|---|---|---|
| 797,073 | 6/1958 | Great Britain | 260/429.7 |

*Primary Examiner*—Donald E. Czaja
*Assistant Examiner*—V. P. Hoke
*Attorney*—Daniel J. Reardon, George E. Lilly and Evelyn Berlow

[57] ABSTRACT

Organotin compounds that have the structural formula

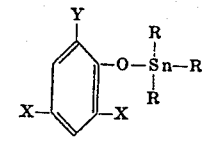

wherein each $R$ represents an alkyl group having from 4 to 8 carbon atoms or a phenyl group; one of the $X$ substituents represents an alkyl group having from 4 to 8 carbon atoms, phenyl, or menthyl; the other $X$ substituent represents hydrogen, halogen, nitro, or an alkyl group having from 1 to 4 carbon atoms; and $Y$ represents hydrogen, halogen, or nitro, are used to protect surface-coating compositions from deterioration resulting from attack by fungi and other microorganisms.

2 Claims, No Drawings

SURFACE-COATING COMPOSITIONS CONTAINING ORGANOTIN FUNGICIDES

This application is a continuation-in-part of my copending application Ser. No. 708,802, which was filed on Feb. 28, 1968, which is now U.S. Pat. No. 3,524,869.

This invention relates to surface-coating compositions. More particularly, it relates to surface-coating compositions containing substituted phenoxytin compounds that have improved resistance to deterioration resulting from attack by fungi and other micro-organisms.

It is well known in the art that paints and varnishes often have inadequate resistance to the action of micro-organisms. Some of these coating compositions, such as enamels and house paints, contain as their resinous binders drying oils, oleoresinous varnishes, or alkyd resins, which are subject to attack by fungi. Others, for example, aqueous dispersions of water-insoluble synthetic linear polymers, generally contain as plasticizers and as thickeners materials that have their origin in animal or vegetable sources and that render the compositions susceptible to mildew. The resulting deterioration of the surface-coating compositions seriously hinders their full scale utilization, particularly in those areas and in those applications that are conducive to such attack. Various biocidal materials have been suggested for use in surface-coating compositions, but none has proven entirely satisfactory in this application. Some do not provide the required prolonged protection against attack by micro-organisms, while others undergo sulfide staining, and still others tend to separate from the applied coating by migration, volatilization, or leaching once the coating has been spread in a thin layer over the surface to be protected.

This invention relates to surface-coating compositions that contain a new class of biocides. These biocides, which are thoroughly compatible with the resinous binders that are commonly used in surface-coating compositions and which are resistant to sulfide staining, provide excellent and prolonged resistance to deterioration resulting from attack by fungi, bacteria, and other micro-organisms without adversely affecting the color, viscosity, and other physical properties of the surface-coating compositions.

The biocidal compounds that are used in the surface-coating compositions may be represented by the structural formula

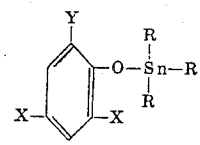

wherein each R represents an alkyl group having from four to eight carbon atoms or a phenyl group; one of the X substituents represents an alkyl group having from four to eight carbon atoms, a phenyl group, or a menthyl group; the other X substituent represents hydrogen, an alkyl group having from one to four carbon atoms, a halogen atom, or a nitro group; and Y represents a hydrogen atom, a halogen atom, or a nitro group. Illustrative of these compounds are the following: tri-n-butyl(4-chloro-6-phenylphenoxy) tin; tri-n-butyl(2,4-dichloro-6-phenylphenoxy) tin; tri-n-butyl(2,4-dinitro-6-phenylphenoxy) tin; tri-n-butyl(4-menthylphenoxy) tin; tri-n-butyl(2-methyl-4-methylphenoxy) tin; tri-n-butyl(2-butyl-4,6-dinitrophenoxy) tin; tri-n-butyl(2-hexyl-4,6-dichlorophenoxy) tin; trioctyl (2,4-dichloro-6-phenylphenoxy) tin; triphenyl (2-phenyl-4-chlorophenoxy) tin; triphenyl (2,4-dibromo-6-phenyl-phenoxy) tin; triphenyl (2,4-dinitro-6-phenylphenoxy) tin; triphenyl(4-menthylphenoxy) tin; triphenyl(2-methyl-4-menthylphenoxy) tin; triphenyl(2-butyl-4,6-dinitrophenoxy) tin; triphenyl(2-octyl-4,6-dichlorophenoxy) tin; triphenyl (2-octyl-4,6-dinitrophenoxy) tin; and the like.

The substituted phenoxy tin compounds may be prepared by any suitable and convenient procedure. For example, they may be prepared by the reaction of a substituted phenol with triphenyl tin hydroxide or a trialkyl tin hydroxide in a hydrocarbon or ketone solvent or by the reaction of an alkali metal salt of a substituted phenol with triphenyl tin chloride or a trialkyl tin chloride in a suitable solvent. The preparation and properties of these compounds are described in detail in my copending U.S. Pat. application Ser. No. 708,802 filed Feb. 28, 1968, now U.S. Pat. No. 3,524,869.

The organotin compounds of this invention can be used to impart fungal and bacterial resistance to a wide variety of surface-coating compositions including both organic solvent-based and water-based coating systems. They are particularly valuable as biocides in coatings that contain as their resinous binder either an oleoresinous material or a water-insoluble synthetic linear addition polymer.

In a preferred embodiment of the invention, a substituted phenoxytin compound is used as the biocide in an organic solvent-based system that contains an oleoresinous binder. Suitable oleoresinous binders include drying oils, such as linseed oil, tung oil, soybean oil, dehydrated castor oil, safflower oil, or fish oil; bodied drying oils; blends of drying oils or bodied drying oils with a resin component, such as limed rosin, an ester gum, or a phenolic resin; oleoresinous varnishes formed by heating one of the aforementioned resins with one or more driving oils or bodied drying oils; and alkyd resins, which are resinous products resulting from the reaction of a polyhydric alcohol such as pentaerythritol or glycerol, with a dicarboxylic acid, such as phthalic anhydride, and fatty acids.

In another preferred embodiment of the invention, the phenoxytin compounds are used in aqueous dispersions that contain about 10 to 60 percent by weight of a water-insoluble resinous binder that is an oleoresinous binder as hereinbefore defined and/or a synthetic linear addition binder. The aqueous dispersions of synthetic linear addition polymers are ordinarily prepared by the emulsion polymerization of ethylenically unsaturated compounds, especially those of monoethylenically unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with vinyl chloride; copolymers of vinyl acetate with acrylonitrile; copolymers of vinyl chloride with acrylonitrile; copolymers of vinyl chloride with vinylidene chloride; polyethylene; polyisobutylene; polystyrene; copolymers of styrene with butadiene; copolymers of acrylonitrile with butadiene; copolymers of methacrylic acids esters of alcohols having one to eight carbon atoms with vinyl acetate, vinyl chloride, acrylonitrile, or styrene; copolymers of acrylic acid esters of alcohols having one to eight carbon atoms with vinyl acetate, vinyl chloride, acrylonitrile, or styrene; copolymers of the aforementioned acrylic acid esters, the aforementioned methacrylic acid esters, and acrylic acid; and copolymers of styrene with maleic anhydride.

Only a small concentration of the organotin compound need be present in the surface-coating compositions of the present invention. It has been found that as little as 0.10 percent of one or more of these compounds, based on the weight of the composition, will bring about an appreciable improvement in the resistance of the composition to attack by micro-organisms. Three percent or more of the biocidal compounds can be used, but these larger amounts generally do not provide further improvement in the properties of the surface-coating compositions and for this reason are not ordinarily used. While the amount of the biocidal compound that will provide optimum protection for a surface-coating composition depends upon such factors as the choice of biocidal compound, the choice of resinous binder and other components of the surface-coating composition and the amount of each that is used, and the application for which the coating composition is intended, in most cases about 1 to 2 percent of the organotin compound, based on the weight of the surface-coating composition, is used.

In addition to the resinous binder and the organotin compound, the surface-coating compositions of the present invention may contain various auxiliary materials, such as pigments, extenders, solvents, dyes, defoaming agents, driers, emulsifiers, dispersing agents, plasticizers, bactericides, and corrosion inhibitors, in the amounts ordinarily used for these purposes.

The phenoxy tin compound that is used as the biocide may be incorporated into the surface-coating composition by any convenient procedure. For example, it can be combined with the pigments and other components to form a pigment phase that is then mixed with the resinous binder and water or organic solvent to form the surface-coating composition. Alternatively, it can be added to a composition that contains the resinous binder, pigment, and water or organic solvent. The organotin compound can be added as such to the other components of the surface-coating composition, or it can be added as a solution of the phenoxy tin compound in, for example, an alcohol, ether, or ketone.

The invention is further illustrated by the examples that follow.

EXAMPLE 1

To a solution of 23.9 grams (0.1 mole) of 2,4-dichloro-6-phenyl-phenol in 200 ml. of methyl ethyl ketone was slowly added 11.4 grams (0.1 mole) of a 50 percent by weight aqueous potassium hydroxide solution. The resulting solution was stirred for one hour and allowed to cool to room temperature. To this solution was slowly added 38.6 grams (0.1 mole) of triphenyltin chloride. The reaction mixture was heated at its reflux temperature for 8 hours, cooled, and filtered. The filtrate was evaporated to dryness, and the residue was dissolved in chloroform. The chloroform solution was washed with water and then heated to remove some of the solvent. The two crops of crystalline product that were obtained were combined and then recrystallized from petroleum ether. There was obtained an 83 percent yield of triphenyl(2,4-dichloro-6-phenylphenoxy)tin, which melted at 142°–144° C. and contained 11.5 percent of chlorine and 20.5 percent of tin (calculated for $C_{30}H_{22}OCl_2Sn$, 12.0% Cl, and 20.0% Sn).

EXAMPLE 2

The following phenoxy tin compounds were prepared by reacting triphenyl tin oxide or tributyl tin oxide with the potassium salt of a substituted phenol by the procedure described in Example 1:

Tributyl(2,4-dichloro-6-phenylphenoxy)tin
Tributyl(2-Sec.butyl-4,6-dinitrophenoxy)tin
Tributyl(2-methyl-4-menthylphenoxy)tin
Triphenyl(2,4-dinitro-—6-phenylphenoxy)tin
Triphenyl(2-phenyl-4-chlorophenoxy)tin
Triphenyl(2-methyl-4-methylphenoxy) tin
Triphenyl(4-menthylphenoxy)tin

EXAMPLE 3

A. A polyvinyl acetate emulsion paint was prepared by mixing together the following materials:

| | Parts by weight |
|---|---|
| Water | 280 |
| Potassium pyrophosphate | 3 |
| Calcium metasilicate | 135 |
| Titanium dioxide (rutile) | 220 |
| 2% Aqueous solution of methylcellulose | 200 |
| Diethyl ether of diethylene glycol | 37 |
| Aqueous solution containing 55% by weight of polyvinyl acetate | 350 |

To samples of this paint was added either 2 percent by weight of one of the phenoxytin compounds of this invention or 2 percent by weight of a comparative biocide.

B. An acrylic paint was prepared by mixing together the following materials:

| | Parts by weight |
|---|---|
| Water | 250 |
| Acrylic acid resin (100% solids) (Acryloid B–66) | 385 |
| Monoethyl ether of ethylene glycol | 259 |
| Titanium dioxide | 143 |
| Aluminum silicate | 45 |
| Magnesium silicate | 98 |

To samples of this paint was added either 2 percent by weight of one of the phenoxytin compounds of this invention or 2 percent by weight of a comparative biocide.

C. An exterior house paint was prepared by mixing together the following materials:

| | Parts by weight |
|---|---|
| Basic lead carbonate | 288 |
| Zinc oxide | 232 |
| Titanium dioxide (rutile) | 149 |
| Talc | 260 |
| Linseed oil (alkali refined) | 242 |
| Bodied linseed oil | 114 |
| Mineral spirits | 114 |
| Antiskinning agent (Exkin 2) | 2 |
| Manganese naphthenate (6%) | 2.27 |
| Lead naphthenate (24%) | 11.3 |

To samples of this paint was added 2 percent by weight of either one of the phenoxytin compounds of this invention or a comparative biocide.

EXAMPLE 4

Samples of the acrylic paint, the polyvinyl acetate paint, and the oil-based paint whose preparation was described in Example 3 were evaluated by the following procedure: Pieces of drawdown paper were dipped into each of the paints, dried for 24 hours, and again dipped into the paint. After a 24-hour drying period, one of the samples coated with each of the treated paints was leached for 24 hours in accordance with Method 5831,CCC–T191b. The coated paper samples were cut into 1¼-inch squares. Each of the coated paper squares was placed on a plate of malt and mycophil agar, which had been inoculated with 1 ml. of a suspension of the test organism. The plates, prepared in triplicate, were incubated at 28° C. and observed weekly. The growth was estimated according to the following key, and the results of the triplicate plates were averaged. In the tables that follow ZO = Zone of inhibition
O = No zone of inhibition
1–10 = Increasing amounts of growth on specimen.

The phenoxytin compounds used and the results of the tests are summarized in the tables that follow:

TABLE I.—RESISTANCE OF ACRYLIC PAINT FILMS TO ATTACK BY FUNGI

| Fungicide | Triphenyl (2,4-dichloro-6-phenyl-phenoxy) tin | Tributyl (2,4-dichloro-6-phenyl-phenoxy) tin | Tributyl (4-menthyl-2-methyl-phenoxy) tin | Tributyl (2-sec. butyl-4,6-dinitro-phenoxy) tin | Bis(phenyl mercuric) dodecenyl succinate (Super Ad-it) | 2,3,5,6-tetrachloro-4-(methyl-sulfonyl) pyridine (Dow 1013) | None |
|---|---|---|---|---|---|---|---|
| pH | 9.4 | 8.4 | 8.9 | 8.3 | 9.0 | 8.0 | 9.2 |
| Effect on color of paint | None | (¹) | None | None | None | None | None |
| Effect on viscosity of paint | None | None | None | None | None | None | None |
| Fungicidal activity: Aspergillus niger: Unleached:* | | | | | | | |
| 1 week | 0 | 0 | 0 | 0 | ZO-6 | 0 | 10 |
| 2 weeks | 0 | 0 | 0 | 0 | ZO-6 | 0 | 10 |

TABLE I.—RESISTANCE OF ACRYLIC PAINT FILMS TO ATTACK BY FUNGI—Continued

| Fungicide | Triphenyl (2,4-dichloro-6-phenyl-phenoxy) tin | Tributyl (2,4-dichloro-6-phenyl-phenoxy) tin | Tributyl (4-menthyl-2-methyl-phenoxy) tin | Tributyl (2-sec. butyl-4,6-dinitro-phenoxy) tin | Bis(phenyl mercuric) dodecenyl succinate (Super Ad-it) | 2,3,5,6-tetrachloro-4-(methyl-sulfonyl) pyridine (Dow 1013) | None |
|---|---|---|---|---|---|---|---|
| 3 weeks | 1 | 0 | 0 | 0 | ZO-4 | 0 | 10 |
| 4 weeks | 1 | 0 | 0 | 0 | ZO-2 | 0 | 10 |
| Leached: | | | | | | | |
| 1 week | 0 | ZO-2 | 0 | 0 | ZO-3 | 0 | 10 |
| 2 weeks | 0 | ZO-2 | 0 | 0 | ZO-3 | 0 | 10 |
| 3 weeks | 1 | 0 | 0 | 0 | ZO-3 | 1 | 10 |
| 4 weeks | 2 | 0 | 0 | 0 | ZO-3 | 1 | 10 |
| *Pullularia pullulans:* | | | | | | | |
| Unleached: | | | | | | | |
| 1 week | 0 | 0 | 0 | 0 | 1 | 0 | 10 |
| 2 weeks | 0 | 0 | 0 | 0 | 1 | 0 | 10 |
| 3 weeks | 0 | 0 | 0 | 0 | 1 | 0 | 10 |
| 4 weeks | 0 | 0 | 0 | 0 | 2 | 0 | 10 |
| Leached: | | | | | | | |
| 1 week | 0 | 0 | 0 | 0 | 0 | 0 | 7 |
| 2 weeks | 0 | 0 | 0 | 0 | 0 | 0 | 10 |
| 3 weeks | 1 | 0 | 0 | 0 | 1 | 0 | 10 |
| 4 weeks | 1 | 0 | 0 | 0 | 2 | 0 | 10 |

* Number of weeks at 28° C. and 90-95% relative humidity.
1 Off white.

TABLE II.—RESISTANCE OF POLYVINYLACETATE PAINT FILMS TO ATTACK BY FUNGI

| Fungicide | Triphenyl-(2,4-dichloro-6-phenyl-phenoxy)tin | Tributyl-(2,4-dichloro-6-phenyl-phenoxy)tin | Tributyl-(4-menthyl-2-methyl-phenoxy)tin | Bis(phenyl-mercuric)-dodecenyl succinate- (Super Ad-it) | 2,3,5,6-tetra-chloro-4-(methylsul-fonyl)-pyridine (Dow 1013) | None |
|---|---|---|---|---|---|---|
| pH | 7.2 | 7.0 | 7.0 | 7.0 | 7.0 | 7.1 |
| Effect of color of paint | None | None | None | None | None | None |
| Effect on viscosity of paint | None | None | None | None | None | None |
| Fungicidal activity: | | | | | | |
| *Aspergillus niger:* | | | | | | |
| Unleached:* | | | | | | |
| 1 week | ZO-1 | ZO-5 | ZO-2 | ZO-13 | ZO-1 | 10 |
| 2 weeks | 0 | ZO-5 | ZO-2 | ZO-12 | 0 | 10 |
| 3 weeks | 0 | ZO-5 | 1 | ZO-12 | 0 | 10 |
| 4 weeks | 0 | ZO-5 | 2 | ZO-12 | 0 | 10 |
| Leached: | | | | | | |
| 1 week | 0 | ZO-5 | ZO-2 | ZO-5 | 0 | 10 |
| 2 weeks | 0 | ZO-5 | ZO-2 | ZO-5 | 0 | 10 |
| 3 weeks | 0 | ZO-5 | 0 | ZO-5 | 0 | 10 |
| 4 weeks | 0 | ZO-3 | 1 | ZO-5 | 0 | 10 |
| *Pullularia pullulans:* | | | | | | |
| Unleached: | | | | | | |
| 1 week | 0 | ZO-3 | ZO-2 | ZO-3 | ZO-1 | 10 |
| 2 weeks | 0 | ZO-2 | ZO-2 | 0 | ZO-1 | 10 |
| 3 weeks | 0 | ZO-2 | ZO-2 | 1 | 0 | 10 |
| 4 weeks | 0 | ZO-2 | ZO-2 | 1 | 0 | 10 |
| Leached: | | | | | | |
| 1 week | 0 | ZO-3 | ZO-1 | 0 | ZO-3 | 7 |
| 2 weeks | 0 | 0 | 0 | 0 | ZO-3 | 9 |
| 3 weeks | 0 | 0 | 0 | 2 | ZO-3 | 9 |
| 4 weeks | 0 | 0 | 0 | 2 | ZO-3 | 9 |

*Number of weeks at 28° C. and 90-95% relative humidity.

TABLE III

Resistance of Oil-based Paint Films to Attack by Fungi

| Fungicide | Triphenyl (2,4-dichloro-6-phenylphenoxy) tin | Bis(phenyl mercuric) dodecenyl succinate (Super Ad-it) | None |
|---|---|---|---|
| Effect on Paint Color | None | None | |
| Fungicidal Activity | | | |
| Aspergillus niger | | | |
| Unleached | | | |
| 1 Week | 0 | ZO-5 | 3 |
| 2 Weeks | 1 | ZO-5 | 6 |
| 3 Weeks | 3 | ZO-5 | 7 |
| 4 Weeks | 3 | ZO-5 | 7 |
| Leached | | | |
| 1 Week | 1 | ZO-5 | 5 |
| 2 Weeks | 1 | ZO-5 | 5 |
| 3 Weeks | 2 | ZO-5 | 6 |
| 4 Weeks | 3 | ZO-5 | 7 |
| Pullularia pullulans | | | |
| Unleached | | | |
| 1 Week | 2 | 0 | 9 |
| 2 Weeks | 3 | 0 | 10 |
| 3 Weeks | 8 | 1 | 10 |
| 4 Weeks | 8 | 1 | 10 |
| Leached | | | |
| 1 Week | 3 | 0 | 9 |
| 2 Weeks | 6 | 1 | 10 |
| 3 Weeks | 10 | 1 | 10 |
| 4 Weeks | 10 | 1 | 10 |

EXAMPLE 5

To samples of the acrylic paint and the polyvinyl acetate paint whose preparation was described in Example 3 were added varying amounts of the phenoxytin compounds or comparative biocides. The paints were evaluated by the following procedure: Pieces of drawdown paper were dipped into each of the paints, dried for 24 hours, and again dipped into the paint. After a 24-hour drying period, the coated paper samples were cut into 1¼-inch squares. Each of the coated paper squares was placed on a plate of malt and mycophil agar, which had been inoculated with 1 ml. of a suspension of the test organism. The plates, prepared in triplicate, were incubated at 28° C. and observed weekly. The results obtained are summarized in Table IV.

TABLE IV.—Resistance of Polyvinylacetate and Acrylic Paint Films to Attack by Fungi and Bacteria

| Biocide | Tributyl (2-methyl-4-menthyl phenoxy) tin | Tributyl (2-sec. butyl-4,6-dinitro-phenoxy) tin | Tributyl (2,4-dichloro-6-phenylphenoxy) tin | Bis(phenyl mercuric)dodecenyl succinate (Super Ad-It) |
|---|---|---|---|---|
| Acrylic paint, pH | 9.0 | 8.7 | 9.2 | 9.0 |
| Fungicidal activity at indicated level: | | | | |
| *Pullularia pullulans:* | | | | |
| 2% | ZO-20 | ZO-19 | ZO-3 | ZO-8 |
| 1% | ZO-13 | ZO-3 | ZO-1 | ZO-7 |
| 0.5% | ZO-6 | ZO-2 | | ZO-6 |
| *Penicillum crustosum:* | | | | |
| 2% | ZO-8 | ZO-5 | ZO-1 | ZO-2 |
| 1% | ZO-7 | ZO-1 | | ZO-1 |
| *Aspergillus niger:* | | | | |
| 2% | ZO-16 | ZO-10 | ZO-5 | ZO-12 |
| 1% | ZO-10 | ZO-3 | ZO-3 | ZO-11 |
| Bacterial activity at indicated level: | | | | |
| *Bacillus subtilis:* | | | | |
| 2% | ZO-7 | ZO-13 | ZO-4 | ZO-13 |
| 1% | ZO-5 | ZO-6 | ZO-1 | ZO-4 |
| *Pseudomonas aeruginosa:* | | | | |
| 2% | | ZO-6 | ZO-1 | ZO-8 |
| *Aerobacter aerogenes:* | | | | |
| 2% | | ZO-3 | ZO-1 | ZO-6 |
| Polyvinyl acetate paint, pH | 7.0 | 6.9 | 7.1 | 7.0 |
| Fungicidal activity at indicated level: | | | | |
| *Pullularia pullulans:* | | | | |
| 2% | ZO-6 | ZO-5 | ZO-5 | ZO-11 |
| 1% | ZO-2 | ZO-6 | ZO-5 | ZO-11 |
| 0.5% | | ZO-5 | ZO-4 | ZO-8 |
| 0.1% | | ZO-2 | ZO-2 | ZO-6 |
| *Penicillum crustosum:* | | | | |
| 2% | ZO-6 | ZO-3 | ZO-5 | ZO-5 |
| 1% | ZO-2 | ZO-3 | ZO-4 | ZO-5 |
| 0.5% | ZO-1 | ZO-2 | ZO-3 | ZO-3 |
| *Aspergillus niger:* | | | | |
| 2% | ZO-10 | ZO-17 | ZO-3 | ZO-17 |
| 1% | ZO-6 | ZO-6 | ZO-3 | ZO-17 |
| 0.5% | | ZO-3 | ZO-3 | ZO-13 |
| Bacterial activity at indicated level: | | | | |
| *Bacillus subtilis:* | | | | |
| 2% | ZO-4 | ZO-11 | ZO-12 | ZO-15 |
| 1% | ZO-4 | ZO-6 | ZO-4 | ZO-7 |
| *Aerobactor aerogenes,* | | | | |
| 2% | | ZO-8 | ZO-2 | ZO-7 |

From the data in the tables it will be seen that the substituted phenoxy tin compounds are effective biocides for both water-based and oil-based paints. They impart to these paints resistance to attack by micro-organisms that is maintained even after leaching. They do not affect the pH, color, viscosity, or heat-aging characteristics of the paints. Unlike those containing bis-(phenylmercury)-dodecenyl succinate as the biocide, the paint films that contain the substituted phenoxy tin compounds do not undergo gray or black staining when they are exposed to hydrogen sulfide.

The terms and expressions which have been employed are used as terms of description and not of limitation. There is no intention in the use of such terms and expressions of excluding any equivalents of the features shown and described or portions thereof; it is, however, recognized that various modifications are possible within the scope of the invention claimed.

What is claimed is:

1. A surface-coating composition having improved resistance to attack by fungi and other micro-organisms that comprises (a) a water-insoluble resinous binder selected from the group consisting of oleoresinous binders, synthetic linear addition polymers obtained by the vinyl polymerization of monoethylenically unsaturated molecules, and mixtures thereof, and (b) about 0.10 to 3 percent, based on the weight of said composition, of tributyl (2-methyl-4-menthylphenoxy) tin.

2. A surface-coating composition having improved resistance to attack by fungi and other micro-organisms that comprises (a) a water-insoluble resinous binder selected from the group consisting of oleoresinous binders, synthetic linear addition polymers obtained by the vinyl polymerization of monoethylenically unsaturated molecules, and mixtures thereof, and (b) about 1 to 2 percent, based on the weight of said composition, of tributyl (2-methyl-4-menthylphenoxy)tin.

* * * * *